Feb. 15, 1966　　　　V. L. FRANTZ　　　　3,234,968
MASTER AND SLAVE VALVE ASSEMBLY

Filed Dec. 21, 1962　　　　　　　　　　　　3 Sheets-Sheet 1

Inventor:
Virgil L. Frantz
By Wilmer Mechlin
his Attorney

Feb. 15, 1966  V. L. FRANTZ  3,234,968
MASTER AND SLAVE VALVE ASSEMBLY
Filed Dec. 21, 1962  3 Sheets-Sheet 2
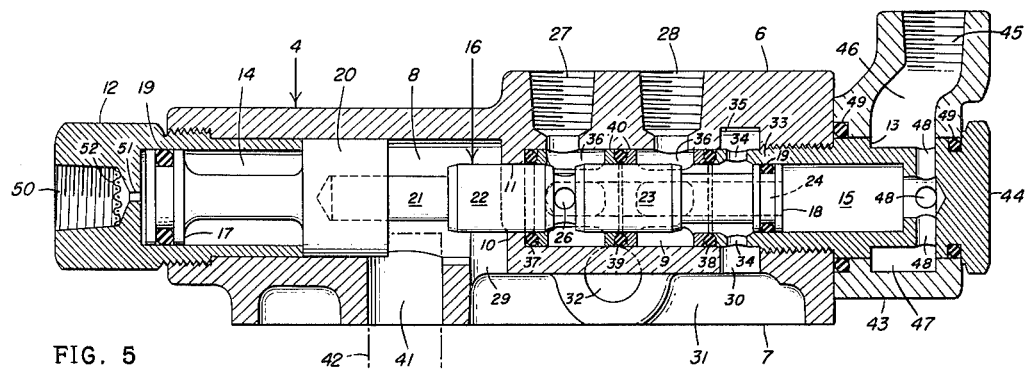
FIG. 5
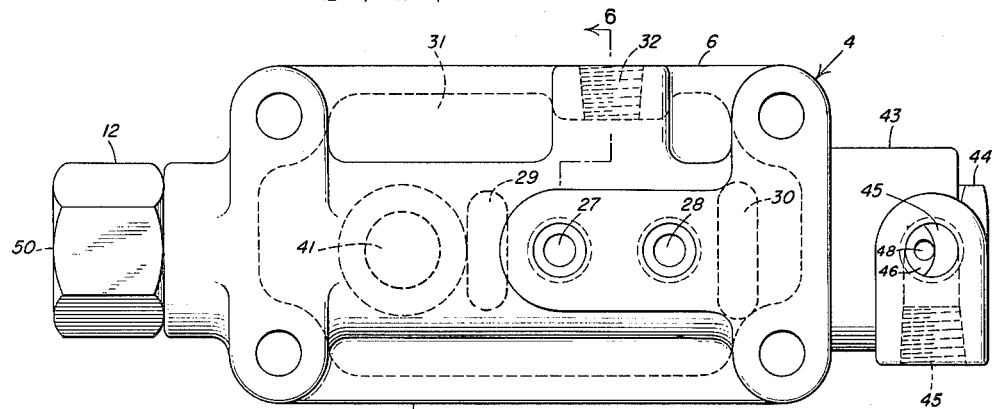
FIG. 3
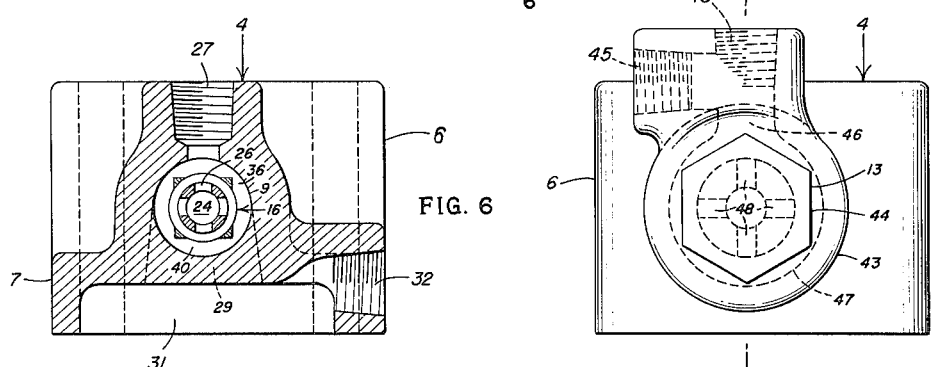
FIG. 6
FIG. 4
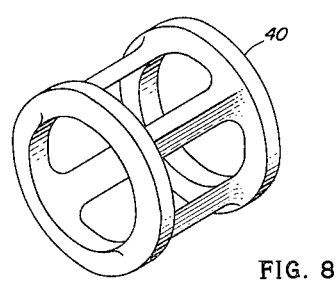
FIG. 8
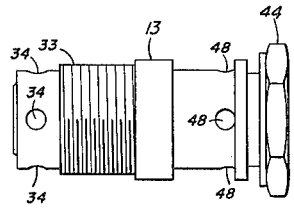
FIG. 7
Inventor:
Virgil L. Frantz
By Wilmer Mecklin
his Attorney Feb. 15, 1966   V. L. FRANTZ   3,234,968
MASTER AND SLAVE VALVE ASSEMBLY
Filed Dec. 21, 1962   3 Sheets-Sheet 3
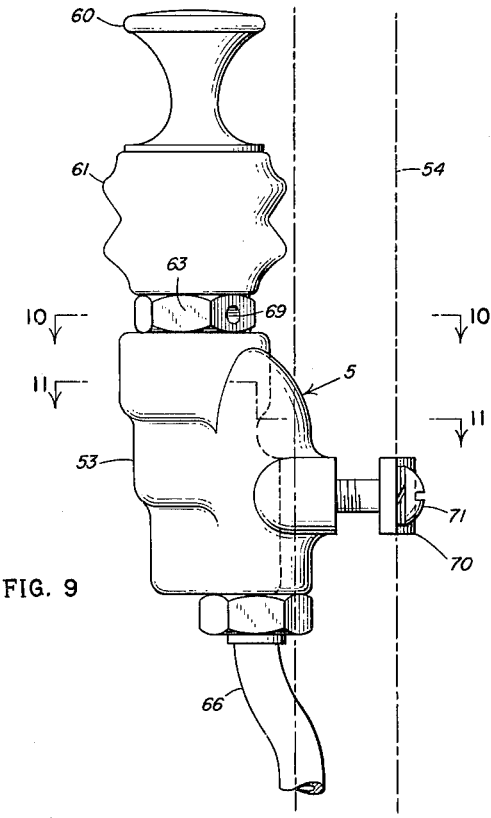
FIG. 9
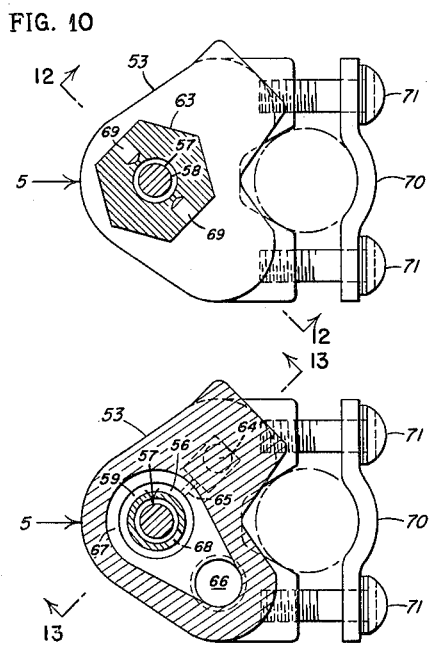
FIG. 10
FIG. 11
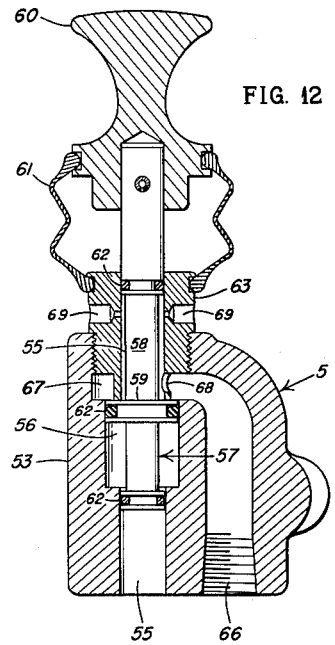
FIG. 12
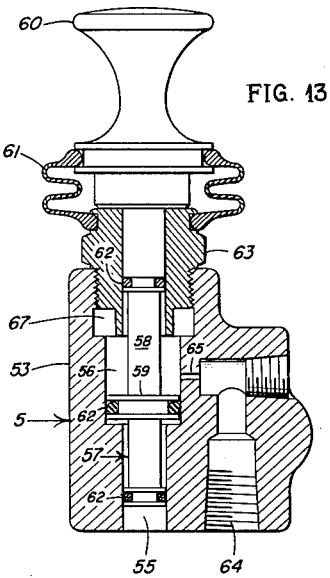
FIG. 13
Inventor:
Virgil L. Frantz
By Wilmer Mechlin
his Attorney

United States Patent Office 3,234,968
Patented Feb. 15, 1966

3,234,968
MASTER AND SLAVE VALVE ASSEMBLY
Virgil L. Frantz, Salem, Va., assignor to Graham-White Sales Corporation, Salem, Va., a corporation of Virginia
Filed Dec. 21, 1962, Ser. No. 246,393
18 Claims. (Cl. 137—625.63)

This invention relates generally to valves for controlling fluid flow and particularly to master and slave valve assemblies in which the operation of one valve is controlled by another.

The primary object of the present invention is to provide an improved master and slave assembly whereby a valve for operating a fluid-actuated device is controlled by a valve positioned at a convenient control station and fluid-connected to the operating valve.

Another object of the invention is to provide a master and slave valve assembly wherein no springs are required for effecting the controlling and responsive movements of the valve elements.

An additional object of the invention is to provide a master and slave valve assembly wherein the forces exerted on the valve element of the slave valve by the fluid which actuates the associated fluid-actuated device are in balance, thereby enabling that element to be shifted in response to the control exerted by the master valve without resistance by such fluid.

A further object of the invention is to provide a master and slave valve assembly wherein the slave valve is operated entirely by fluid pressure and is so arranged and constructed as to require a minimum of pressure for its operation.

Another object of the invention is to provide a master valve for a master and slave valve assembly, the valve element of which is selectively positionable in any of a plurality of positions and is positively held in any such position by a force exerted by the fluid by which it operates the slave valve.

Another object of the invention is to provide an improved master or control valve which is effective in its control whether fixed or movably mounted.

An additional object of the invention is to provide an improved operating valve having as its valve element a differential piston and so arranged and constructed as to require substantially the same pressure to shift the piston in either direction.

A further object of the invention is to provide a fluid-operating valve, the valve element of which is readily lockable in any of a plurality of selected positions.

A further object of the invention is to provide in a master and slave valve assembly improvements in the mounting of the master valve for adapting it for mounting on a movable member and in the fitting on the slave valve for connecting it to reservoir or line pressure, thereby facilitating the installation and maintenance of the valves.

Other objects and advantages of the invention will appear hereinafter in the detailed description, be particularly pointed out in the appended claims and be illustrated in the accompanying drawings, in which:

FIGURE 3 is a plan view of the slave valve of the preferred assembly;

FIGURE 4 is an end elevational view of the valve of FIGURE 3;

FIGURE 5 is a vertical sectional view taken along lines 5—5 of FIGURE 4;

FIGURE 6 is a vertical sectional view taken along lines 6—6 of FIGURE 3;

FIGURE 7 is a side elevational view of the retainer plug of the slave valve;

FIGURE 8 is an isometric view on an enlarged scale of one of the spacer cages of the slave valve;

FIGURE 9 is a side elevational view of the master valve of the preferred assembly;

FIGURE 10 is a horizontal sectional view taken along lines 10—10 of FIGURE 9;

FIGURE 11 is a horizontal sectional view taken along lines 11—11 of FIGURE 9;

FIGURE 12 is a vertical sectional view taken along lines 12—12 of FIGURE 10;

FIGURE 13 is a vertical sectional view taken along lines 13—13 of FIGURE 11;

Figure 1:
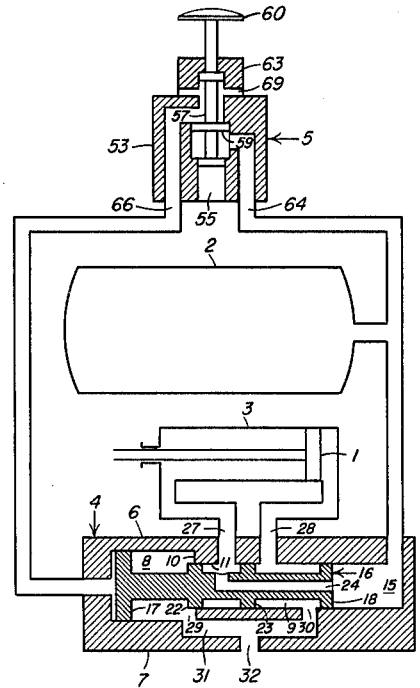
FIGURE 1 is a flow diagram of a typical installation of a preferred embodiment of the master and slave valve assembly of the present invention showing the effect on the slave valve and associated device of one setting of the master valve.

Referring now in detail to the drawings in which like reference characters designate like parts, the improved master and slave valve assembly of the present invention is suitable for use in installations requiring an operating valve to control the operation of a fluid-actuated device, such as a piston, and in turn be controlled by a control valve located at a convenient control station. As exemplary of the invention, the gear assembly has been illustrated in a form particularly designed for use in a truck, tractor, or other self-propelled vehicle fitted with a transmission providing a plurality of alternately operative gear ranges, for selectively establishing the range in which the vehicle is operating.

A transmission of the above type usually has a pair of alternately operative gear trains, one for high and the other for low range. As indicated in the flow diagrams of FIGURES 1 and 2, these trains are adapted to be alternately shifted into operative position by a piston 1 shiftable in one or the other axial direction by fluid pressure against its opposite ends, the fluid pressure, normally air, being derived from a reservoir or storage tank 2 and maintained at substantially constant pressure by a compressor (not shown).

Operation of the piston 1 to cause it to shift by directing fluid into one end of the cylinder 3 containing the piston, while exhausting fluid from the cylinder's other end, is the function of the slave or operating valve 4 shown diagrammatically in the above figures and in detail in FIGURES 3–8. The selective operation of the slave valve 4, determinative of the direction in which the piston 1 is shifted, in turn is determined or controlled by a master or control valve 5 shown diagrammatically in FIGURES 1 and 2 and in detail in FIGURES 9–15.

Considering first the preferred slave valve 4 and particularly its detailed showing in FIGURES 5–8, the valve is comprised of a body or casing 6 conveniently having an integral base 7 for bolting or other attachment to a suitable support (not shown). In and extending axially or longitudinally of the body 6 and each opening into one of its ends are a pair of concentric, cylindrical apertures, sockets, or openings, the larger or relatively large aperture designated as 8 and the smaller or relatively small aperture as 9. The apertures 8 and 9 are separated intermediate and roughly midway of the ends of the body 6 by a partition or septum 10 pierced or perforated by a cylindrical way, orifice, or opning 11 concentric with but smaller than either of the apertures connectable through it. Each of the two apertures 8 and 9 normally is closed at its outer end by a closure member inserted and preferably threaded into it, the larger aperture 8 having as its end closure member a plug 12 ported for connection to the master valve 5 and the closure member for the smaller aperture 9 being a cap 13 ported axially for connection to the reservoir 2. The plug and cap have in them inwardly opening cylinders 14 and 15, respectively, which, like the apertures into which the plug and cap extend, are concentric with each other and the apertures but differ in their cross-sectional area, the cylinder 14 in the plug being the larger.

Extending through the intermediate way or orifice 11 and slidable or shiftable in the apertures 8 and 9 and axially or longitudinally of the body 6 is a differential piston 16 having at its opposite ends a large head 17 and a small head 18, the large head being contained and slidable in the plug cylinder 14 and the small head related in like manner to the cap cylinder 15. The large and small heads 17 and 18 are intended to be exposed to and acted upon by fluid pressure, respectively from the reservoir 2 and from the master valve 5 and, to prevent leakage about them without dependence upon a close tolerance metal-to-metal fit, preferably are periphery grooved to receive and to carry O-rings or like sealing gaskets 19 adapted to wipe against sides of the cylinders. For the reason later to be pointed out, it is preferred that the cross-sectional area of the large head 17 exposable to reservoir pressure be substantially double or twice that of the small head 18.

To facilitate manufacture, the differential piston 16 conveniently is formed of two interfitting parts which, when assembled or interfitted, are suitable fixed against relative movement, one part having formed on it in addition to the large head 17 a cylindrical shoulder or abutment 20 preferably of larger diameter than and spaced inwardly from the head by the intervening portion of the piston's stem 21 and slidable in and against the side of the large aperture 8 between the inner end of the plug 12 and the confronting side of the partition 10. The other part, contained mainly in the small aperture but projecting into the large aperture 8 has formed on it in addition to and inwardly of the small head 18, inner and outer, generally cylindrical spools or enlargements 22 and 23. Spaced axially from each other and the small head by intervening portions of the stem 21, the spools 22 and 23 are preferably of a diameter substantially equal to that of the way 11, as well as that of the small head 18 and the cap cylinder 15 in which that head slides. The stem 21, in the part of the piston 16 mounting the small head 18 and spools 22 and 23, has in it an axial or central bore or passage 24 opening through the small head 18 onto the piston's adjoining end and extending into the stem at least to the inner spool 22. This axial bore, in addition to opening axially at its outer end, opens radially through one or a plurality of radial drillings or openings 26 between or intermediate the inner and outer spools 22 and 23.

To enable the slave valve 4 to operate as intended upon the piston 1, its body 6 is provided with inner and outer, axially spaced, radially directed outlet ports 27 and 28, respectively, which open inwardly onto the small aperture 9 intermediate or between the partition 10 and inner end of the cap 13. The body 6 also is provided with a pair of axially spaced, radially directed, inner and outer exhaust or bleed ports 29 and 30, respectively, the outer port 30 opening inwardly onto the small aperture 9 through the cap 13 beyond the inner end of the cylinder 15 and the inner port 29 opening inwardly onto the large aperture 8 adjacent the partition 10. Directed for convenience oppositively from the outlet ports 27 and 28 and toward the base 7, the exhaust ports 29 and 30 in the illustrated embodiment open outwardly on a cavity 31 within the base, the cavity in turn being open to atmosphere through a side opening 32 when the base is applied to a suitable support. To communicate or connect the interior of the cap 13 with the outer exhaust port 30 opening onto the small aperture 9, the cap in its side wall 33 has one or more radial drillings, perforations, or openings 34 opening either directly onto the exhaust port or onto an encircling annular groove 35 formed in the body 6 and interrupting the side of the small aperture and connected to the exhaust port.

Between its inner end bounded by the partition 10 and the inner end of the cap 13, the small aperture 9 is divided into a pair of chambers or compartments 36, each open to one of the outlet ports 27 and 28, by a plurality of O-rings. Thus a pair of O-rings, inner and outer O-rings 37 and 38, straddles the chambers 36 and another O-ring, a center or middle O-ring 39 is disposed between the chambers. Adapted to be wiped by the sides of the spools 22 and 23 and to engage and seal between those sides and the confronting side of the small aperture 9, the O-rings 37, 38 and 39 are axially spaced by spacer cages or spacers 40 radially perforated for access of fluid therethrough into the chambers 36. In the reciprocable movement of the piston 16, the inner spool 22 alternately engages the inner and center O-rings while the outer spool similarly engages the center and outer O-rings, in each case sealing against flow of fluid about the piston past the engaged O-ring.

Constructed in the above manner, the differential piston 16 is slidable or reciprocable between limits imposes at one end by engagement of the cylindrical abutment 20 with the partition 10 and at the other by engagement of the abutment with the inner end of the plug 12. At the latter of these limits, as indicated in FIGURES 1 and 5, the inner outlet port 27 connected to the inner end of the piston cylinder 3, is in communication, through the associated spacer 40 and the inner radial drillings 26 and axial bore 24 in the stem 21, with the cylinder 15 in the cap 13. At the same time, the other or outer outlet port 28 communicates through the associated spacer ring and the radial drillings 34 in the cap 13 with the outer exhaust port 30 for exhausting or bleeding the outer end of the piston cylinder 3. Conversely, at the other limit of movement of the differential piston 16 indicated in FIGURE 2, the inner outlet port 27 now serves as an inlet for connecting its end of the cylinder 3 through the intervening spacer ring 40 and way 11 to the large aperture 8 and therefrom through the inner exhaust port 29. At this time, the other or outer outlet port 28 is connected through the inner radial drillings 26 and axial bore 24 in the stem 21 to the cap cylinder 15. The reservoir 2 and cap cylinder being at all times open to each other, the position of the differential piston thus will position the piston 1 in one end or the other of the cylinder 3 by determining to which end of the the cylinder reservoir pressure is applied and concurrently bleeding the other end of the cylinder to atmosphere.

The preferred construction of the slave or operating valve 4 has several advantages. With the cross-sectional area of the large head 17 of the differential piston 16, exposable to reservoir pressure, double that of the small head, the resultant or effective force exerted on the piston will be the same, whether the pressure is applied only to the small head or to both heads. Too, the same fluid pressure that acts on the small head also is responsible for shifting and holding the piston 1 in one position or the other in the cylinder 3. This not only eliminates the need for a separate source of pressure to operate the piston 1, but, since the confronting ends of the spools 22 and 23 have the same free areas, the axial forces exerted on the differential piston by the fluid flowing through it to either outlet port 27 or 28 are in balance and offer no resistance to shifting of the piston in either direction. In addition, the abutment or shoulder 20 on the differential piston 16 not only serves to limit movement of the piston in either direction, but, by providing in the body 6 an aperture or opening 41 opening onto one or the other end of the abutment, depending on the latter's position in the large aperture, a locking pin or key, indicated at 42, can be applied through the aperture against either end of the abutment for locking the piston against movement in one or the other of its end positions. At the same time, mounting of the large head 17 in the plug cylinder 14, rather than directly in the large aperture 8, enables the abutment 20 to be made of a size to take the locking pin without correspondingly increasing the size of the large head 17 and thus the axial force exerted by the reservoir pressure upon the piston.

Another important feature of the preferred slave valve 4 is the manner in which the cap cylinder 15 is connected to the reservoir 2. An inlet port for the cap cylinder may be formed in the cap 13. However, to facilitate installation, it is preferred that the inlet port be independent of the rotative position of the cap. To this end, there is swivelly or rotatably mounted on the cap beyond the body 6 a swivel coupling, connector or fitting 43. Held in place against the adjoining end of the body by the head 44 of the cap, the swivel coupling 43, instead of one, preferably has two right angularly related ports 45 connected within the coupling, either of which is usable as an inlet port for the slave valve 4 and the other as a take-off or connection for connecting the master valve 5 to reservoir pressure from the reservoir 2, thus eliminating the need for either an external T or a separate line from the master valve to the reservoir. The ports 45 are connected to each other and alternately connectable as an inlet port to the master valve by a common inlet passage 46 leading to an annular groove 47 formed in the coupling and cap and open to and surrounding or encircling radial and axial cross-drillings or intakes 48 in the cap connecting to the cap cylinder 15. With the intervening joint sealed against leakage by O-rings 49 between the coupling and cap at opposite sides of the groove 47, the swivel coupling, by being turnable through a full circle, enables the line from the reservoir 2 to be led to the slave valve 4 at the angle most convenient in the particular installation.

With the reservoir pressure constantly applied to the small head 18 of the differential piston 16, the operation of the operating or slave valve 4 is controlled by and responsive to the presence or absence of reservoir pressure upon the large head 17. Too, the rate of movement of the differential piston between positions is dependent upon the rate of flow of fluid through the port 50 in the plug 12 to and from the plug cylinder 14. To obtain a cushioned rather than an abrupt movement of the differential piston between postions, the flow of compressed air from and to the plug cylinder 14 preferably is restricted or slowed by a restricted orifice 51 in the plug between the cylinder and the port and protected by a screen 52 in the port which is cleaned of any debris by the outflowing air as the cylinder is exhausted to atmosphere.

Figure 2:
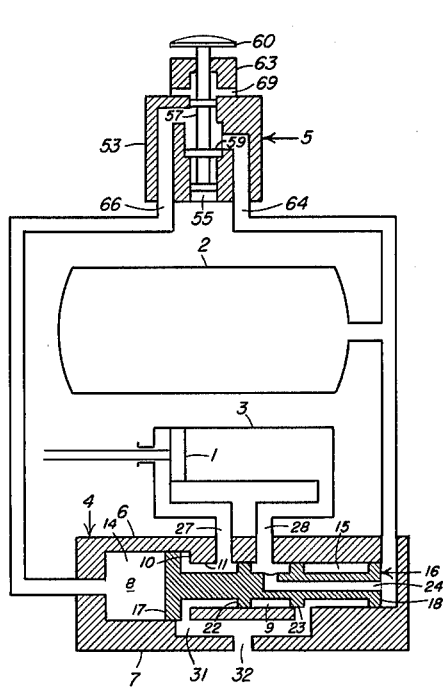
FIGURE 2 is a flow diagram similar to FIGURE 1 except that the control valve is in another setting.

The control or master valve 5 shown diagrammatically in FIGURES 1 and 2 and in detail in FIGURES 9–15, in its preferred form is a manually actuated or operated push-pull valve. Connectable to a source of fluid pressure and to an operating valve, the control valve 5 not only is positionable alternately or selectively to connect the operating valve to the pressure source and to atmosphere, but is locked in selected position by the fluid pressure from the source.

The preferred control or master valve 5 is comprised of a body, casing or housing 53, which, for the preferred mounting, ordinarily will be grooved on one side and generally of V-shape in cross-section, to adapt it to fit on and be clamped to a gear shift lever indicated at 54. So shaped, the body 53 has extending longitudinally through its central portion a cylindrical bore 55 which opens intermediate its ends onto a cylindrical chamber 56 concentric or coaxial with and of larger diameter than the bore. Reciprocably mounted in the bore 55 is a piston or slide valve 57, the stem 58 of which slides in the bore beyond either end of the chamber 56 and carries or has fixed to it intermediate its ends a main or intermediate head or valve element 59 slidably mounted in the chamber.

The valve stem 58 projects beyond or above the body 53 at one, here the upper, end of the bore and on its projecting end carries or has fixed a knob or handle 60. The interventing projecting portion of the stem 58 conveniently is protected from dirt or other foreign matter by a rubber or like expansible boot or bellows 61 having its ends anchored to the knob 60 and body 53. Leakage of fluid around the head 59 and through the ends of the bore 55 is effectively prevented by O-rings or like gaskets 62, one carried by the head and wiping against the side of the chamber 56 and a pair carried by the stem 58, one beyond either end of the chamber and each wiping against the side of its part of the bore. For access to the chamber 56, for assembly and servicing, the part of the body 53 containing the bore 55 at one, here the upper, end of the chamber is formed as a removable cap 63 threaded into body's main part.

The body 53 of the master valve 4 is ported for separate connections to the reservoir 2 and to the plug port 50 in the slave valve 5. The porting for introducing pressure from the reservoir 2 into the body preferably is by a single port 64 communicating or connecting with the chamber 56 through an inlet orifice 65 opening onto a side of the chamber intermediate and preferably substantially midway of the latter's ends. For the connection to the plug port 50, a single outlet port 66 is provided in the body 53 and this port leads through a passage in the body to the upper part of the bore 55 adjacent or immediately above the upper end of the chamber 56, conveniently through a circumferential groove 67 and one or more radial drillings 68 in the lower end portion of the cap 63. In addition to the inlet and outlet ports 64 and 66, the master valve has one or more exhaust ports 69 conveniently drilled radially through the side of the cap above or beyond the main part of the body 53 and connecting to the upper part of the bore 55 contained in the cap 63. Designed to be selectively connected to the exhaust ports 69 and to the inlet port 64, the outlet port 66 is made connectable to the inlet port through the chamber 56 and annular groove 67 and to the exhaust ports through the upper part of the bore 55 by restricting or reducing the diameter of the upper part of the stem between the head 59 and the upper O-ring 62, relative to the diameter of the adjoining part of the bore, to provide the necessary clearance about the stem.

Constructed in the above manner, the master valve 5, when its piston 57 is pushed in, will have the head 59 on the piston 57 disposed below the inlet orifice 65, thus connecting the outlet port 66 to the inlet port 64 through the groove 67 in the cap 63, the chamber 56 and the inlet orifice 65. Conversely, when the piston 57 is in its out, pulled or up position, the head 59 with its surrounding O-ring 62 will be disposed at the upper end of the chamber 56 and block communication between the inlet and outlet ports 64 and 66. At that time the upper stem O-ring 62, which previously had been positioned below the exhaust ports 69 to block communication therebetween and the outlet port 66, is disposed in the upper part of the bore 55 above the exhaust ports so that the latter and the outlet port can communicate. Consequently, in its in, pushed or down position, the piston 57, by connecting its outlet port to reservoir pressure, enables that pressure to be introduced through the plug port 50 into the cylinder 14 in the plug 12 of the slave valve 4 outwardly of the large head 17 of the differential piston 16 and that valve and there act against that head, and in its out position enables that aperture to be bled or exhausted through the exhaust ports 69 in the body 53 of the control valve.

Not only is the master valve 5 enabled to control the application and removal of reservoir pressure to and from the large head 17 of the differential piston 16 of the slave valve 4, but it makes use of the same pressure to hold its piston 57 in either out or in position. At the limits of movement of the piston 57, its head 59 is disposed in the chamber 56 at one or the other side of the inlet orifice 65. The head having a larger diameter and greater axially-facing free area than any other part of the stem 58 simultaneously exposed to the pressure, the resultant axial force on the piston at any time necessarily is in the direction in which the pressure acts upon the head. As a result, the piston 57 in either out or in position, is held or locked in that position by the action of the reservoir pressure on the head 59 and can only be shifted between positions by applying an axial force opposing and greater than that exerted by the fluid. Since dependent upon the exposed area on either end of the head 59, the axial force exerted by the fluid on the piston can be readily gauged to prevent shifting of the piston, a force of around twelve (12) pounds having been found ample for the purpose in the preferred installation.

Figure 14:
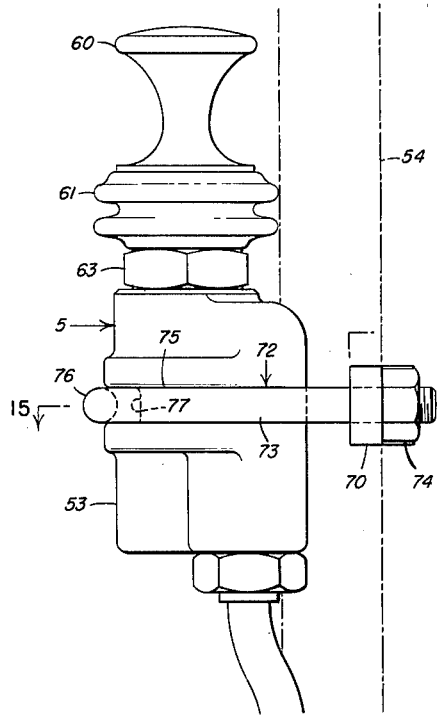
FIGURE 14 is a side elevational view of a modification of the master valve of FIGURE 9.
Figure 15:
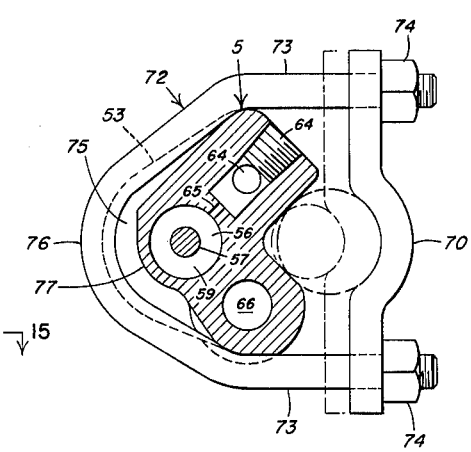
FIGURE 15 is a horizontal sectional view taken along lines 15—15 of FIGURE 14.

Although otherwise alike, the control valve of FIGURES 9–13 and that of FIGURES 14 and 15 differ in the manner in which they are clamped to the gear shift lever 54. In the former, the clamping is by a clamp or clamp bar 70 attached by screws 71 to the sides of the valve body 53 at opposite sides of the lever 54. While usually effective, such a clamp has a tendency to loosen under the service shocks occasioned by movement and vibration of the lever. It, accordingly, is preferred to use, instead, the arrangement shown in FIGURES 14 and 15, in which the clamp bar 70, instead of being attached by screws directly to the body, is attached to the legs of a U-bolt 72 straddling or embracing both the body and the lever. The U-bolt 72 is conventional in having parallel legs 73 projecting through the clamp 70 and held by lock nuts 74 thereto. However, if the U-bolt were permitted to bear against the mid-or central portion of the body 53 in which the piston-mounting bore 55 is formed, the force applicable through it to the preferred cast aluminum body, could well distort the latter and interfere with the operation of the piston. Consequently, although the U-bolt 72 is positioned longitudinally of the body by a rib-reinforced groove 75, the loop 76 connecting the bolt's legs 73 is of generally V- rather than U-shape and its shape and relieving of the inner wall 77 of the groove from the middle to the sides of the body, effectively limits to the sides the points at which the clamping pressure can be exerted through the U-bolt on the body.

From the above-detailed description, it will be apparent there has been provided a master and slave valve assembly which is of rugged construction and effective in operation. Since O-rings rather than metal-to-metal fits are depended on for sealing between relatively moving parts in both valves, it also will be apparent that servicing of the assembly in the main will entail simply the replacement of worn O-rings. It should be understood that the described and disclosed assembly is merely exemplary of the invention and that all modifications are intended to be included that do not depart from the spirit of the invention and the scope of the appended claims.

Having described my invention, I claim:

1. A valve assembly comprising master and slave valves each connected to each other and to a fluid pressure source, a differential piston in said slave valve and having a small head constantly exposed to pressure from said source and a large head exposable to pressure from said master valve, valve means in said master valve and selectively positionable for selectively positioning said piston by alternately exposing said large head to pressure from said source and to atmospheric pressure, and means in said assembly responsive to said source pressure for holding said valve means and piston in selected position.

2. A valve assembly comprising master and slave valves each connected to each other and to a fluid pressure source, a differential piston in said slave valve and having a small head constantly exposed to pressure from said source and a large head exposable to pressure from said master valve, valve means in said master valve and selectively positionable for selectively positioning said piston by alternately exposing said large head to pressure from said source and to atmospheric pressure, and means on said valve means responsive to said source pressure for locking said valve means in selected position.

3. A valve assembly comprising master and slave valves each connected to each other and to a fluid pressure source, a differential piston in said slave valve and having a small head constantly exposed to pressure from said source and a large head exposable to pressure from said master valve, valve means in said master valve and selectively positionable for selectively positioning said piston by alternately exposing said large head to pressure from said source and to atmospheric pressure, means on said valve means responsive to pressure from said source for locking said valve means in selected position, and means for locking said slave valve against operation by said master valve.

4. A valve assembly comprising a slave valve connectable to a fluid pressure source, a master valve connected to said slave valve and therethrough to said source, a differential piston in said slave valve and having a small head constantly exposed to pressure from said source and a large head exposable to pressure from said master valve, valve means in said master valve and selectively positionable for selectively positioning said piston by alternately exposing said large head to pressure from said source and to atmospheric pressure, and means responsive to said source pressure for locking said valve means in selected position.

5. In a valve assembly, a master valve comprising a body, spaced inlet, outlet and exhaust ports in said body, a push-pull piston in said body and selectively positionable for alternately connecting said outlet port to said inlet and exhaust ports, a chamber in said body in constant communication intermediate ends thereof with said inlet port, and a head on said piston sealingly engaging and slidable in and between opposite ends of said chamber on movement of said piston between selected positions, said head on said movement alternately presenting opposite ends to fluid pressure from said inlet port for locking said piston in selected position.

6. In a valve assembly, a control valve comprising a body, a bore extending through said body, a handle fixed to said piston beyond said body for manual actuation thereof, a head intermediate ends of a stem of said piston and slidable in a chamber intermediate ends of said bore, means sealing between said stem and bore beyond opposite ends of said chamber, an inlet port in said body and connecting to said chamber intermediate said ends thereof, exhaust port means in said body and connecting to said bore beyond an end of said chamber, an outlet port in said body and connecting to said bore intermediate said chamber end and the connection of said exhaust port means to said bore, one of said sealing means between said stem and bore being on said stem and positioned beyond and between the connections of said outlet port and exhaust port means to said bore at opposite extremities of movement of said piston for alternately connecting and disconnecting said outlet port and exhaust port means, and means sealing between said head and chamber, said head on movement of said piston between said extremities alternately connecting and disconnecting said inlet and outlet ports and presenting its opposite ends to fluid pressure from said inlet port for locking said piston at said extremities.

7. In a valve assembly, a control valve comprising a body, a valve chamber in said body, a removable cap threaded into said body and closing one end of said chamber, a bore restricted relative to and concentric with said chamber and extending through said cap and into said body beyond the opposite end of said chamber, a piston extending through said chamber and cap and having end portions slidable in said bore beyond opposite ends of said chamber, a head on said piston slidable in and carrying means sealingly engaging a side of said chamber, sealing means on said piston beyond opposite ends of said head and sealingly engaging said bore, an inlet port in said body and connecting to said chamber intermediate ends thereof, an exhaust port connected to said bore in said cap, and an outlet port connected to said bore in said cap intermediate the connection thereto of said exhaust port and the adjoining end of said chamber, said outlet port being connectable about said piston with said exhaust and inlet ports, said piston being selectively positionable for alternately connecting said outlet port to said inlet and exhaust ports, and said head in the selected positions of said piston presenting different ends to fluid pressure introduced into said chamber from said inlet port for locking said piston in selected position.

8. In a valve assembly, a control valve comprising a body, a bore extending from one end into said body intermediate sides thereof, inlet, outlet and exhaust ports in said body and connecting at spaced positions to said bore, a reciprocable piston in said bore and selectively positionable for alternately connecting said outlet port to said inlet and exhaust ports, a head on said piston sealingly engaging said bore and having opposite ends alternately exposable to fluid pressure from said inlet port for locking said piston in selected position, and means for clamping said body to a mounting member.

9. In a valve assembly, a control valve comprising a body, a bore extending from one end into said body intermediate sides thereof, inlent, outlet and exhaust ports in said body and connecting at spaced positions to said bore, a reciprocable piston in said bore and selectively positionable for alternately connecting said outlet port to said inlet and exhaust ports, a head on said piston sealingly engaging said bore and having opposite ends alternately exposable to fluid pressure from said inlet port for locking sad piston in selected position, and means including a U-bolt for clamping said body to a mounting, said body and U-bolt being so arranged and constructed as to limit to sides of said body the points at which said U-bolt can apply clamping pressure thereto.

10. In a valve assembly, an operating valve comprising a body having an aperture therein, a differential piston reciprocable in said aperture and having axially spaced large and small heads, spaced ports connected to said aperture beyond said heads, a plurality of ports opening onto said aperture intermediate said heads, and a passage extending into said piston through the small head thereof and radially ported therebeyond for alternately connecting said intermediate port to the port connected to said aperture beyond sad small head.

11. In a valve assembly, an operating valve comprising a body having an aperture therein, a differential piston reciprocable in said aperture and having large and small heads, a port for constantly connecting said aperture beyond said small head to a source of fluid pressure, a port connecting to said aperture beyond said large head, spaced outlet ports connected to said aperture intermediate said heads, spaced exhaust ports connected to said aperture intermediate said heads and each related to one of said outlet ports, a passage extending into said piston through said small head and radially ported therebeyond, and means on said piston operative on reciprocation thereof alternately to connect said outlet ports to said pressure source through said passage.

12. In a valve assembly, an operating valve comprising a body having an aperture therein, a differential piston reciprocable in said aperture and having large and small heads, a port for constantly connecting said aperture beyond said small head to a source of fluid pressure, a port connecting to said aperture beyond said large head, spaced outlet ports connected to said aperture intermediate said heads, spaced exhaust ports connected to said aperture intermediate said heads and each related to one of said outlet ports, a passage extending into said piston through said small head and radially ported therebeyond, and means on said piston operative on reciprocation thereof alternately to connect said outlet ports to said pressure source through said passage and simultaneously connecting the unconnected outlet to the related exhaust port about said piston.

13. In a valve assembly, an operating valve comprising a body having an aperture therein, a differential piston reciprocable in said aperture and having axially spaced large and small heads, spaced ports connected to said aperture beyond said heads, a plurality of ports opening onto said aperture intermediate said heads, a passage extending into said piston through said small head and radially ported therebeyond for alternately connecting said intermediate ports to the port connected to said aperture beyond said small head, and means for locking said piston against operation at either extremity of its movement.

14. In a valve assembly, an operating valve comprising a body having an aperture extending therethrough, a piston reciprocable in said body and having axially spaced large and small heads, a ported plug removably inserted into one end of said aperture and containing a cylinder mounting said large head, ported cap means removably inserted into the opposite end of said aperture and containing a cylinder mounting said small head, a plurality of spaced outlet ports opening onto said aperture intermediate said plug and cap means, a plurality of spaced exhaust ports connected to said aperture intermediate said plug and cap means and each related to one of said outlet ports, a passage extending into said piston through said small head, a plurality of axially spaced radial ports in said piston intermediate said heads and opening from said passage onto said aperture, sealing means dividing said aperture into a plurality of chambers each open to one of said outlet ports, and spaced spools on said piston and alternating therealong with the radial ports from said passage, said spools on reciprocable movement of said piston cooperating with said sealing means for alternately connecting said outlet ports to said cap cylinder through said passage and to the related of said inlet ports about said piston.

15. In a valve assembly, an operating valve comprising a body having an aperture therein, a differential piston reciprocable in said aperture and having axially spaced large and small heads, sleeve means in said aperture slidably mounting said large head, abutment means on said piston intermediate said heads and of larger diameter than said large head, ports opening onto said aperture beyond said head, outlet ports opening onto said aperture intermediate said heads, said piston at extremities of its reciprocable movement in said aperture selectively connecting said outlet port means to one of said first-named ports, and means insertable radially into said aperture and alternately engageable with opposite ends of said abutment means for locking said piston at either extremity of its movement.

16. In a valve assembly, an operating valve comprising a body having an aperture therein, outlet port means opening onto said aperture intermediate ends thereof, a removable cap closing an end of said aperture, an inlet port in said cap, a piston reciprocable in said aperture for selectively connecting said outlet port means to said inlet port, and a connector mounted on and swivable about said cap for connecting fluid line means to said body at any of a plurality of angles.

17. In a valve assembly, an operating valve comprising a body having an aperture therein, a differential piston reciprocable in said aperture and having axially spaced large and small heads, a first port connected to said aperture beyond said small head and constantly connectable to a source of fluid pressure, a second port connected to said aperture beyond said large head and alternately connectable to said source and to atmosphere, outlet port means connected to said aperture intermediate said heads and connectable through said aperture to said first port, said piston shifting in one direction in response to application of pressure from said source only on said small head and in the opposite direction on application of pressure to both heads for selectively connecting said outlet port means to said first port.

18. In a valve assembly, an operating valve comprising a body having an aperture therein, a differential piston reciprocable in said aperture and having surfaces thereon facing in opposite axial directions, one of said surfaces having substantially double the area of the other, a first port connected to said aperture beyond the smaller of said surfaces and constantly connectable to a source of fluid pressure, a second port connected to said aperture beyond the larger of said surfaces and alternately connectable to said source and to atmosphere, and outlet port means connected to said aperture and connectable therethrough to said first port, said piston shifting in opposite directions and under substantially the same force on selective application of pressure from said source only to said small surface and to both of said surfaces.

References Cited by the Examiner
UNITED STATES PATENTS

| | | | |
|---|---|---|---|
| 715,136 | 12/1902 | Patterson | 137—625.69 X |
| 1,900,049 | 3/1933 | Ellison | 85—1 |
| 2,116,556 | 5/1938 | Bellis | 137—625.68 |
| 2,307,328 | 1/1943 | Martin | 285—190 |
| 2,362,339 | 11/1944 | Armington | 137—596.18 |
| 2,839,081 | 6/1958 | Wolf | 137—615 X |
| 3,085,833 | 4/1963 | Schultz | 137—625.69 X |
| 3,095,903 | 7/1963 | Jennings | 137—625.68 |
| 3,115,371 | 12/1963 | Valentine | 303—50 X |

References Cited by the Applicant
UNITED STATES PATENTS 2,564,686  8/1951  Gray.

M. CARY NELSON, *Primary Examiner.*

MARTIN P. SCHWADRON, *Examiner.*